Feb. 27, 1973  MITSUYOSHI SAWAMURA ET AL  3,718,799
APPARATUS FOR ELECTRICALLY BONDING CEMENTED CARBIDE
ELEMENTS TO THE TEETH OF A SAW BLADE
Filed June 30, 1971  3 Sheets-Sheet 1

INVENTORS
Mitsuyoshi Sawamura
Taboshi Hihara
BY
Chittick, Pfund Birch Samuels & Gauthier
Attorneys

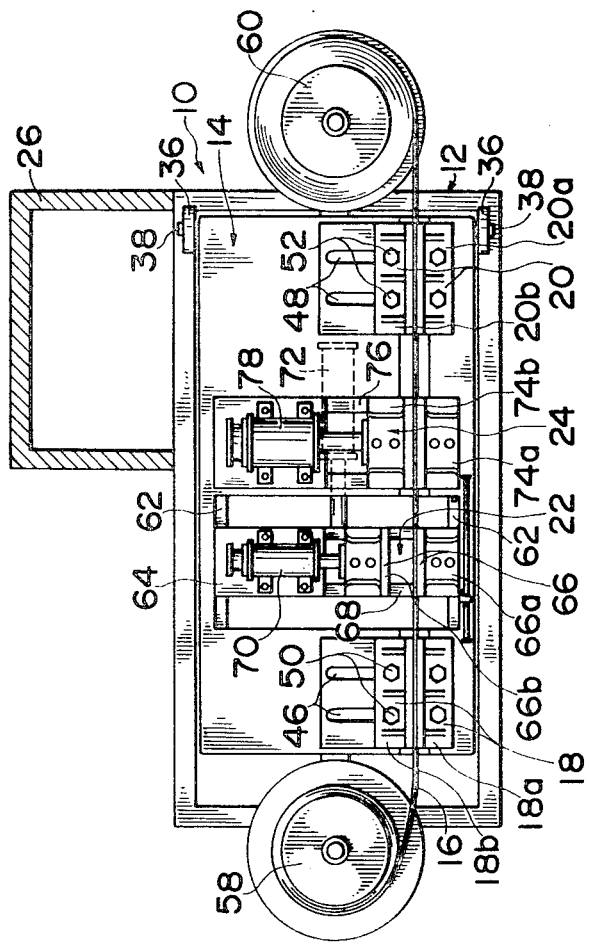

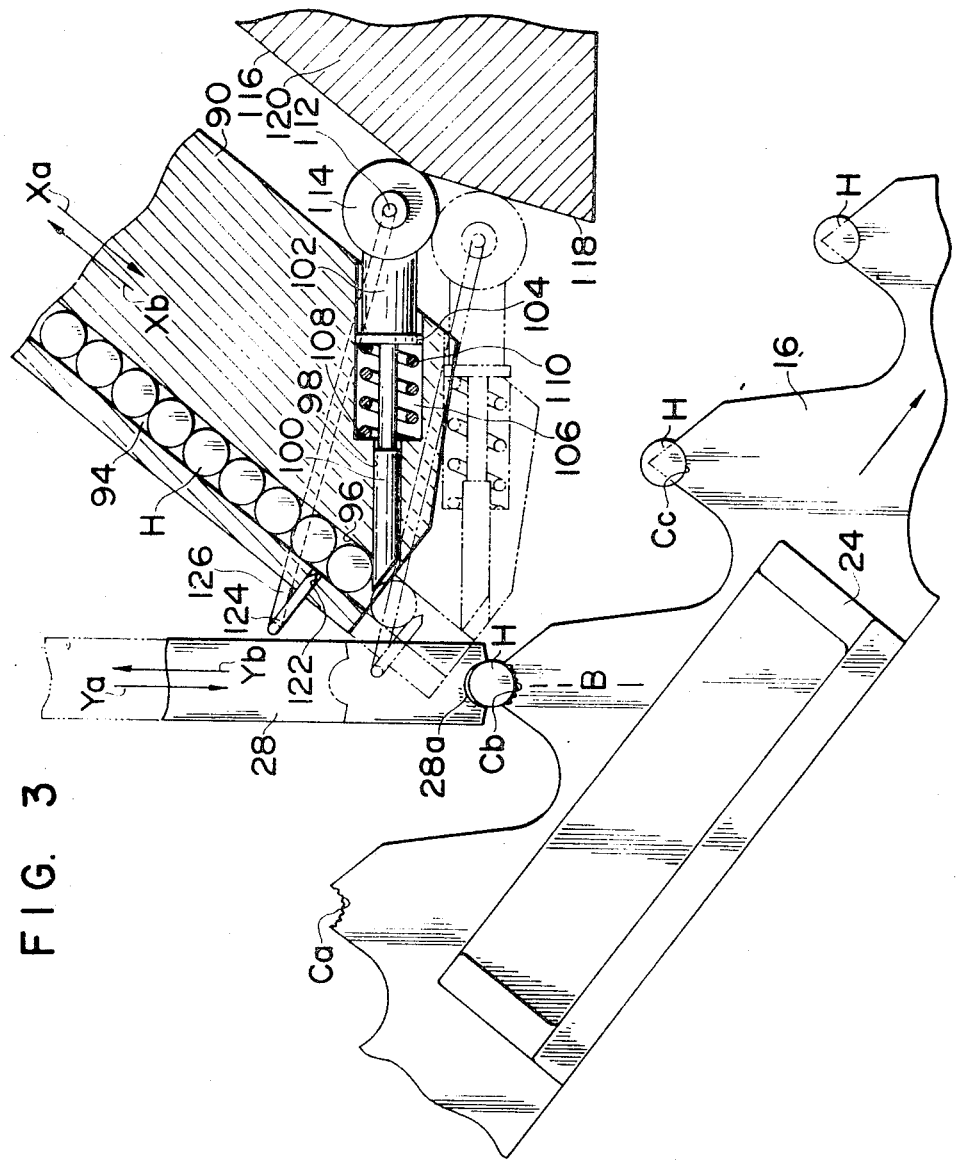

United States Patent Office 3,718,799
Patented Feb. 27, 1973

3,718,799
APPARATUS FOR ELECTRICALLY BONDING CEMENTED CARBIDE ELEMENTS TO THE TEETH OF A SAW BLADE
Mitsuyoshi Sawamura, 56 Hata-machi, Ono, Japan, and Takeshi Hihara, 6-8-4 Shinjinno, Jinno-cho, Kakogawa, Japan
Filed June 30, 1971, Ser. No. 158,264
Claims priority, application Japan, July 22, 1970
(utility model), 45/72,632
Int. Cl. B23k 9/04
U.S. Cl. 219—77
6 Claims

ABSTRACT OF THE DISCLOSURE

An apparatus for electrically bonding cemented carbide elements to the teeth of a saw blade, including a feed mechanism cooperating with guides to intermittently advance the saw blade past a work station. A releasable holding mechanism holds the blade at the work station and serves as a stationary electrode which cooperates with another movable electrode to bond the carbide elements into recesses in the blade teeth. The carbide elements are individually presented to the point of application by a feed mechanism also located at the work station.

DESCRIPTION OF THE INVENTION

This invention relates in general to devices for bonding metals together, and more particularly to an apparatus for electrically bonding cemented carbide elements to the teeth of saw blades such as for example those employed in circular saws, band saws and the like.

In the past, it had been the practice to manufacture saw blades in one piece from a single metal, usually of a high quality alloy steel, especially where the saw blades are to be used in high speed sawing operation. However, experience has indicated that it would be preferable to have a blade with teeth sections having physical properties different from the remainder of the blade. For example, one desirable combination might include teeth sections having high resistance to wear in order to provide a blade capable of undergoing prolonged service without the need for frequent and repeated sharpening operations, with the remainder of the blade having high tensile strength in order to withstand the stresses ordinarily experienced by blades during high speed sawing operations.

In an attempt at satisfying these requirements, efforts have been made to produce blades from high quality alloy steels, with cemented carbide elements bonded to the teeth sections to provide increased wear resistance. Conventionally, the carbide elements have been bonded to the saw blade by brazing. However, this conventional technique has not proved satisfactory, primarily because the carbide elements exhibit a tendency to break away from the blank. It appears that this is caused by the poor tensile strength of the bonding alloys (usually an alloy of copper and zinc), particularly when the blade is subjected to the high temperatures developed during cutting operations.

The basic object of the present invention is to obviate the above-mentioned problem by providing a novel and improved apparatus for bonding carbide elements to the teeth of a saw blade. This, and other objects and advantages of the present invention will become more apparent as the description proceeds with the aid of the accompanying drawings, wherein:

FIG. 2 is a sectional view taken along line 2—2 of FIG. 1; and,

FIG. 3 is an enlarged front view, partially in section showing the bonding unit and the device for supplying the carbide elements.

Figure 1:
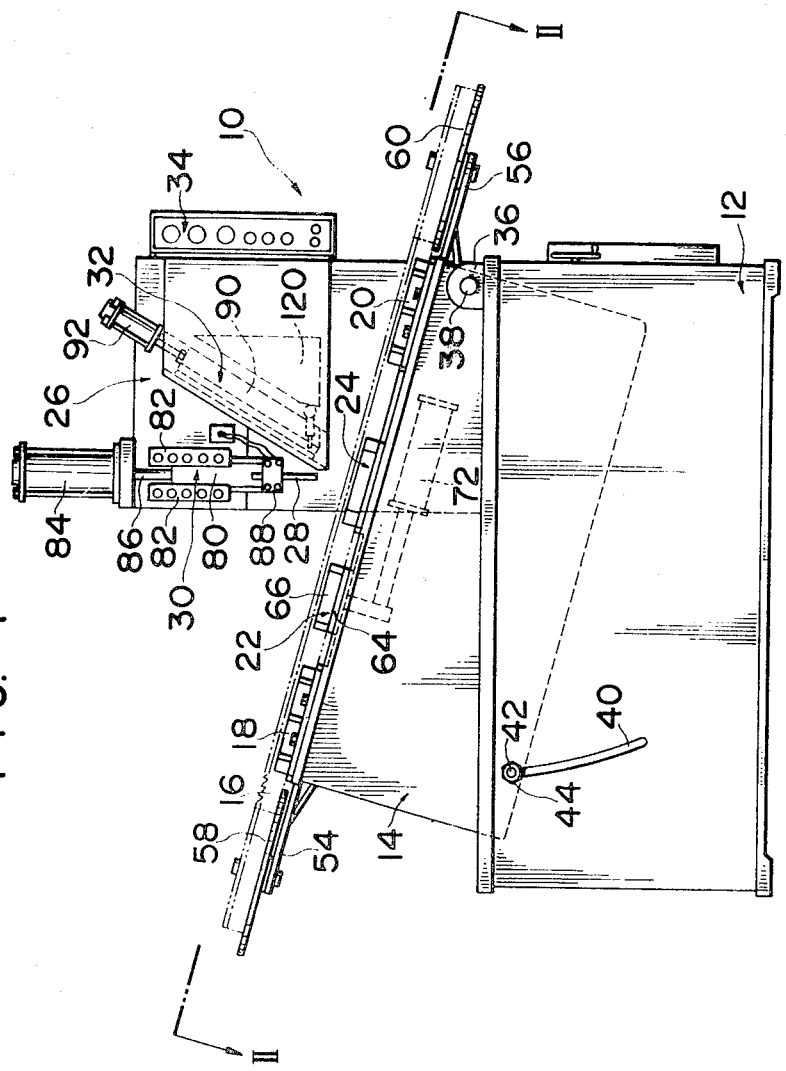
FIG. 1 is a front elevational view showing an apparatus embodying the concepts of the present invention.

The machine according to the present invention is shown generally at 10 in the accompanying drawings. In FIGS. 1 and 2, worktable 14 is mounted to the base 12 so as to be tiltable, with means for fixing the table at the desired tilted position.

Guide means 18 and 20 are provided on the upper surface of the tiltable worktable 14 in the vicinity of the front and end portions thereof for laterally engaging and guiding saw blade 16. A blade feed unit 22 and a stationary holding unit 24 are mounted between the guide means 18 and 20, the latter unit serving at the same time as a lower electrode as will be explained later. Base 12 is provided with a vertically extending stationary housing 26 on which is mounted an upper electrode 28, an electrode actuating device 30, and a supply unit 32 for automatically supplying individual cemented carbide elements to the saw blade 16 in a regualr sequence. Housing 20 also encloses an electric power source for supplying low voltage current to the upper electrode 28, and a timing mechanism for controlling the supply of said current as well as the movement by the upper electrode 28 between its operative and inoperative positions. The electric power source and timing mechanism are conventional components and hence have not been illustrated in the drawings. A control panel 34 for actuating the said devices is mounted on one side of the upper housing 26.

Referring to the details of each component part of the present apparatus, the worktable 14 has laterally projecting pins 38 which are jouranalled for pivotal motion in brackets 36 extending upwardly from oppositely disposed points adjacent to the right-hand side of base 12 as viewed in FIGS. 1 and 2. Worktable 14 is further provided with a threaded bolt 42 which projects laterally through an arcuate slot 40 in the front wall of base 12, and onto which is threaded a nut 44. Thus it will be seen that the nut 44 can be loosened, the table 14 tilted about an axis defined by pins 38 to any desired working angle, and thereafter again fixed by tightening nut 44.

The blade guide means 18 and 20 on the upper surface of worktable 14 each comprise fixed guide members 18a and 20a and movable guide members 18b and 20b respectively. The movable guide members 18b and 20b are slidably mounted for movement along elongated grooves 46 and 48 formed on the worktable 14, respectively, so as to be movable therealong and secured in the desired positions by means of bolts 50 and 52 respectively. This adjustment in the spacing between the fixed and movable elements of the blade guides 18 and 20 provides a means of accommodating blades 16 of different thickness. Towards the outside of the guide means 18 and 20, brackets 54 and 56 are provided to the left hand and right hand side end portions of the worktable 14, and a supply roll 58 and a take-up roll 60 for the saw blade 16 are rotatably mounted on the brackets 54 and 56 substantially flush with the plane of the work surface of the worktable 14.

Referring now to the blade feed means or unit 22, a pair of parallel guide rails 62 are provided along the sides of the worktable 14. A feed vise block 64 is slidably mounted on the guide rails 62 for movement in a direction parallel to the feed direction of the saw blade 16.

A feed vise 66 is mounted on vise block 64. Feed vise 66 comprises a fixed vise jaw 66a and a movable vise jaw 66b, the latter being slidably mounted on a pair of rails 68. The vise jaw 66b is moved towards or away from the fixed vise jaw 66a to either clamp or release the saw blade 16 positioned therebetween, by means of a piston and cylinder assembly 70 which can either be of the hydraulic or pneumatic type. The feed vise block 64 is in turn actuatable to move a predetermined distance on the rails 62 in the feed direction of the saw blade 16 by means of another piston and cylinder unit 72 enclosed inside the worktable 14. Thus, the saw blade 16 can be moved a distance equal to one saw-tooth pitch through the fixed holding unit 24 per each actuation of the feed cylinder 72.

The fixed holding means or unit 24 which is located at a position to be hereinafter referred to as the "work station," comprises a fixed vise jaw 74a secured to the worktable 14 and a movable vise jaw 74b which is slidably mounted on a pair of parallel guide rails 76 extending in a direction transverse to the feed direction of the saw blade 16. The vise jaws 74a and 74b serve as a lower electrode and are supplied with low voltage current from the power source contained within housing 26. The movable vise jaw 74b is actuated to move towards and away from the vise jaw 74a by means of a piston and cylinder unit 78 so as to clamp the saw blade 16 therebetween, or release it. The piston and cylinder units 78 and 70 are operatively coupled to each other through a suitable control means (not shown) in a manner such that when the feed vise 66 is in the saw blade release position, the holding unit 24 is in the saw blade clamping position and vice versa. It is to be noted that the fixed guide members 18a and 20a of the blade guide means 18 and 20, the fixed vise jaws 66a of the feed vise 66 and the fixed vise jaw 74a of the holding unit 24 are mounted in alignment to each other on the worktable 14.

Referring to the electrode actuating device 30, a ram 80 which is mounted for vertical sliding movement on a pair of guide rails 82 on housing 26 is secured at the top to the piston rod 86 of a cylinder 84. Cylinder 84 is preferably hydraulically actuated, and is also mounted on housing 26. The ram 80 is fitted at the bottom with an electrode holder 88 which removably carries the upper electrode 28 in a position overlying the holding unit 24. The upper electrode 28 is supplied with current from the power source in housing 26, through the electrode holder 88. As is best shown in FIG. 3, the electrode holder 88 is formed at the bottom with a suitable recess 28a, as in the shape of a semicircle to fit the shape of the circular cemented carbide elements H to be bonded to the blade 16.

With further reference to FIG. 3, the supply means or unit 32 for the cemented carbide elements H to be applied to the saw blade is shown comprising an inclined holder 90 slidably mounted inside the upper housing 26. The holder 90 is reciprocally actuated by means of an actuating cylinder 92. Holder 90 has an elongated groove 94 adapted to contain a plurality of circular disc shaped cemented carbide elements H in a one-on-one stacked arrangement. A bore 98 extends horizontally through the holder 90 starting from the lowermost zone of the bottom surface 96 of the groove 94. A pawl member 100 connected integrally at the rear by means of a reduced diameter section to a section of larger diameter or back-up piece 102 is slidably received inside the bore 98 in such a way that the front part of member 100 can slide into and out of groove 94. The back-up piece 102 has a flange 104 which slidably engages the wall of an enlarged bore section 106. Bore section 106 communicates at one end with bore section 98, and is open at the rear face of the holder 90. A coiled spring 110 is mounted under compression between the stepped portion 108 of the bore section 106 and the flange 104. A roller 114 is mounted for free rotation on a transverse axle 112 on back-up piece 102. Spring 110 urges roller 114 into contact with a cam plate 120 having first and second angularly disposed cam surfaces 116 and 118. A connecting rod 126 is connected at one end to the enlarged section 102 and at the other end to a stopper rod 124 slidably received within a hole 122 opening into the lower region of the groove 94 at a point spaced slightly above the opening of bore section 98. The distance along groove 94 between hole 122 and bore 98 is approximately equal to the diameter of the cemented carbide elements H.

The operation of the above-described apparatus will now be reviewed. A saw blade 16 having teeth sections on its cutting edge formed with semi-circular recesses indicated typically in FIG. 3 at Ca, Cb, Cc, is placed around the supply roller 58 and held positively at one end by the holding unit 24, with the blade section extending between the roll 58 and the holding unit 24 being threaded through the guide means 18 and the feed mechanism 22. The worktable 14 is then adjusted to a tilted position at an appropriate angle relative to the base 12 for performing the bonding operation on a blade 16 of the type shown in the drawings. It will be understood that when initially setting up the apparatus, the first blade tooth will be located at a "bonding position" shown in FIG. 3 at B. Subsequent intermittent adjustment of the blade position caused by actuation of the feed mechanism 22 will result in the sequential positioning of the remaining blade teeth at said bonding position B. With a tooth now located at the bonding position B, the supply cylinder 92 is then set into operation for lowering the holder 90 of the supply unit 32 along its path of travel in a direction shown by the arrow Xa. The roller 114 is caused at this time to move along the second cam surface 118 (which is inclined at a different angle than the path indicated by Xa) of the cam plate 120, as depicted by the chain-dotted line in FIG. 3, thus causing the pawl piece 100 to be retracted into the bore section 98 under the action of the compression spring 110. At the same time, the enlarged section 102 will recede relative to groove 94. This in turn causes the stopper rod 124 to move through hole 122 into groove 94 to an inserted position between the lowermost cemented carbide element H in groove 94 and the one positioned immediately above it. With the stopper rod 124 inserted in groove 94, and with the pawl piece 100 retracted under the influence of spring 110, the lowermost element H is thus free to drop under the influence of gravity out of groove 94. The remainder of the elements H are of course retained in groove 94 by the inserted stopper rod.

As the holder 90 reaches the terminal point of its downward stroke, the pawl piece 100 is receded completely into the region of the bore section 98 and the lowermost cemented carbide piece H is deposited in the semicircular recess Cb on the saw blade 16. The operation of the actuating cylinder 92 is then reversed, and the holder 90 is raised with quick action in the direction indicated by the arrow Xb. The rear section 102 is advanced in its relative position to the groove 94 of the holder 90, the pawl piece 100 and the stopper rod 124 being thus returned to their former position for the next supply stroke. Simultaneously, cylinder 84 is actuated and the ram 80 is caused to slide downwards along rails 82 with the upper electrode 28 attached thereto in the direction marked by the arrow Ya. As the recessed part 28a of the upper electrode 28 touches the carbide element H now resting in the semicircular recess Cb of the saw blade 16, low voltage current is allowed to flow between the upper electrode 28 and the fixed holder unit 24. As the current is passed through the extremely narrow contact area between the cemented carbide element H and the semicircular recess Cb, both the element H and the surface of the recess Cb start to fuse on account of the locally generated heat. The heat thus generated is accompanied by pressure being exerted on the carbide element H by the cylinder 84 through the piston rod 86, ram 80, holder 88 and upper electrode 28. In this way, the element H is completely bonded to the semicircular recess Cb of the saw blade 16. When bonding is complete, operation of cylinder 84 is reversed and the upper electrode 28 is raised in the direction marked by the arrow Yb to its former position. Then, vise cylinder 78 of the fixed holder unit 24 and cylinder 70 of the feed unit 22 are actuated simultaneously in a manner such that the fixed holder unit 24 and the feed unit 22 are brought to the saw blade release position and the saw blade engagement position respectively. With the feed vise 66 now holding the saw blade 16, the feed cylinder is operated to move the feed vise block 64 towards the holder unit 24.

In this way, the saw blade 16 is advanced one pitch. Upon completion of the band saw feed operation, the holder unit 24 will again hold the saw blade 16 in position, while the feed vise 66 is brought to the saw-blade release position and the feed vise restored to its former position. The cemented carbide element H can be bonded in succession to the respective teeth sections of the saw blade 16 by repetition of the above-mentioned procedure. The completed band saw is passed through the guide means 20 and wound around the take-up roller 60.

While the foregoing description has been directed to an embodiment in which the circular cemented carbide elements H are bonded to the cutting edge of the saw blade, it will be understood that elements having different shapes, for example squares, rectangles, triangles, etc. can also be handled to concentrate the bonding current and generate higher heat with bonding in a similar manner. It should also be pointed out that, when the surfaces of the semi-circular recesses on the teeth sections are formed with small elevations and depressions, i.e., serrated, the contact area between the cemented carbide elements and the semi-circular recesses can be further reduced and the bonding effect enhanced considerably.

In light of the foregoing, it will be further appreciated by those skilled in the art that the apparatus 10 can be modified to handle circular saw blades without departing from the spirit and scope of the invention. This could be accomplished by substituting a driven rotating holder for the feed vise 66 shown in the drawings. The need for feed and take-up rolls 58 and 60, and guides 18 and 20 would of course be obviated where circular saw blades are being operated upon. The rotating holder would operate intermittently to present the teeth on the the circular saw blade individually to a point of application underlying the line of travel of the upper electrode 28.

It is our intention to cover all changes and modifications to the above-described and referred to embodiments which do not depart from the spirt and scope of the invention as defined by the claims appended hereto.

We claim:

1. Apparatus for electrically bonding a plurality of cemented carbide elements to the successive teeth of a cutting blade, wherein the teeth are each provided with an appropriately dimensioned recess for receiving the aforesaid elements, said apparatus comprising: feed means for intermittently moving the cutting blade to locate individual teeth successively at a bonding position, holding means for holding the cutting blade in a fixed position following each operation of said feed means to locate a blade tooth at said bonding position, said holding means being connected to a source of electric current and thus also serving as a first electrode, supply means for depositing a cemented carbide element in the recess of each blade tooth located at said bonding position, and a second electrode successively movable, along a path aligned with said bonding position, between a remote inoperative position spaced from said deposited cemented carbide elements, and an operative position in successive contact with said deposited cemented carbide elements, said second electrode also connected to said source of electric current, whereupon when said second electrode is operatively positioned, electric current may flow from said source through a circuit including said second electrode, a deposited cemented carbide element, the cutting blade and the first electrode, to electrically bond said deposited cemented carbide element in the recess of a tooth located at said bonding position.

2. The apparatus as claimed in claim 1 further characterized by said second electrode being movable between the operative and inoperative positions by means including a piston and cylinder unit, which unit is operable to apply pressure to the cemented carbide element during the electrical bonding operation.

3. The application as claimed in claim 1 wherein said feed means and said holding means are located on a worktable which is angularly adjustable in relation to said supply means and said second electrode.

4. The apparatus as claimed in claim 1 wherein said second electrode has a recessed end adapted to fit said successively contacted cemented carbide elements.

5. The apparatus as claimed in claim 1 wherein said supply means comprises: a holder having an elongated open-bottomed groove adapted to contain said cemented carbide element in a one-on-one stacked arrangement, said open bottom being above said bonding position, said holder also having a hole opening into said groove; a first stop member normally projecting at least partly across the bottom portion of said groove to retain said elements within said groove, said first stop member being located such that said hole is positioned between the lowest element and the element above it; a second stop member normally located within said hole and out of said groove; means for reciprocating said holder downwardly and upwardly; and, means, responsive to movement of said holder, for simultaneously guiding said first stop member from its normal position and said second stop member through said hole to project it into said groove as said holder moves downwardly, said guiding means also simultaneously guiding said first and second stop members to their normal position as said holder moves upwardly, whereby one cemented carbide element is allowed to drop to the bonding position as said holder moves downwardly and returns to its original position.

6. The application as claimed in claim 5 wherein said holder reciprocates downwardly and upwardly on an angular path; said first and second stop members project into said groove from opposite sides; and said guiding means comprises a roller, a cam surface adapted to be engaged by said roller, extending downwardly at an angle different than the angle of said angular path and lying in a plane substantially perpendicular to a plane within which said stop members project into said groove, means for rotatably connecting said stop members to said roller, and means for moving said roller down and up said cam surface in response to said downwardly and upwardly reciprocation of said holder.

References Cited

UNITED STATES PATENTS

| | | | |
|---|---|---|---|
| 3,034,378 | 5/1962 | Anderson | 76—112 |
| 501,755 | 7/1893 | Bain | 219—77 |
| 3,146,333 | 8/1964 | Cooper et al. | 219—80 |
| 3,619,545 | 11/1971 | Borden. | |

JOSEPH V. TRUHC, Primary Examiner

L. A. SCHUTZMAN, Assistant Examiner

U.S. Cl. X.R.

76—112; 219—80